United States Patent [19]

Hirshberg et al.

[11] Patent Number: 4,801,174
[45] Date of Patent: Jan. 31, 1989

[54] TRANSPARENT ROOF CONVERTIBLE AUTOMOBILE

[75] Inventors: Gerald P. Hirshberg; Joseph E. Mrozowski, both of Del Mar; Stephen D. Ball, San Diego, all of Calif.

[73] Assignee: Nissan Design International, Inc., San Diego, Calif.

[21] Appl. No.: 204,105

[22] Filed: Jun. 8, 1988

Related U.S. Application Data

[63] Continuation-in-part of Ser. No. 107,862, Oct. 7, 1987, abandoned, which is a continuation of Ser. No. 855,821, Apr. 24, 1986, abandoned.

[51] Int. Cl.[4] .................. B60J 7/047; B60J 7/057
[52] U.S. Cl. .................... 296/216; 296/106; 296/220; 296/222; 296/146; 296/223
[58] Field of Search .............. 296/76, 106, 107, 99 R, 296/216, 220, 222, 146, 223

[56] References Cited

U.S. PATENT DOCUMENTS

| | | | |
|---|---|---|---|
| 2,289,173 | 7/1942 | Best | 296/107 |
| 2,785,922 | 3/1957 | Chika | 296/107 |
| 3,044,825 | 7/1962 | Golde | 296/216 |
| 3,713,689 | 1/1973 | Podolan et al. | 296/220 |
| 3,720,440 | 3/1973 | Podolan | 296/219 |
| 3,823,977 | 7/1974 | Fioravanti | 296/107 X |
| 4,168,859 | 9/1979 | Breitschwerdt et al. | 296/102 X |
| 4,286,821 | 9/1981 | Cooper | 296/216 |
| 4,415,195 | 11/1983 | Furukawa et al. | 296/146 |
| 4,463,983 | 8/1984 | Hellriegel | 296/213 |
| 4,474,405 | 10/1984 | Kloppe et al. | 296/220 |
| 4,695,090 | 9/1987 | Draper | 296/216 |
| 4,700,982 | 10/1987 | Kuraoka et al. | 296/107 |

FOREIGN PATENT DOCUMENTS

| | | | |
|---|---|---|---|
| 0101322 | 2/1984 | European Pat. Off. | 296/222 |
| 1455459 | 4/1969 | Fed. Rep. of Germany . | |
| 2723996 | 11/1978 | Fed. Rep. of Germany . | |
| 149213 | 11/1981 | Japan | 296/218 |
| 85713 | 5/1983 | Japan | 296/216 |
| 143719 | 8/1984 | Japan | 296/222 |
| 405418 | 2/1934 | United Kingdom . | |

Primary Examiner—Dennis W. Pedder
Attorney, Agent, or Firm—Baker, Maxham & Jester

[57] ABSTRACT

An automobile body is provided that has a front windshield, a rear window and a pair of side panels cooperatively defining a passenger compartment with a roof opening. A transparent roof panel having an area corresponding to that of the roof opening is mounted for generally translatory movement from a normal position in which it covers the roof opening to a retracted position in which the roof opening is uncovered. When the transparent roof panel is in its retracted position it lies either above or below the rear window so that a person seated in the passenger compartment can view in a rearward direction through both the rear window and the transparent roof panel.

10 Claims, 11 Drawing Sheets

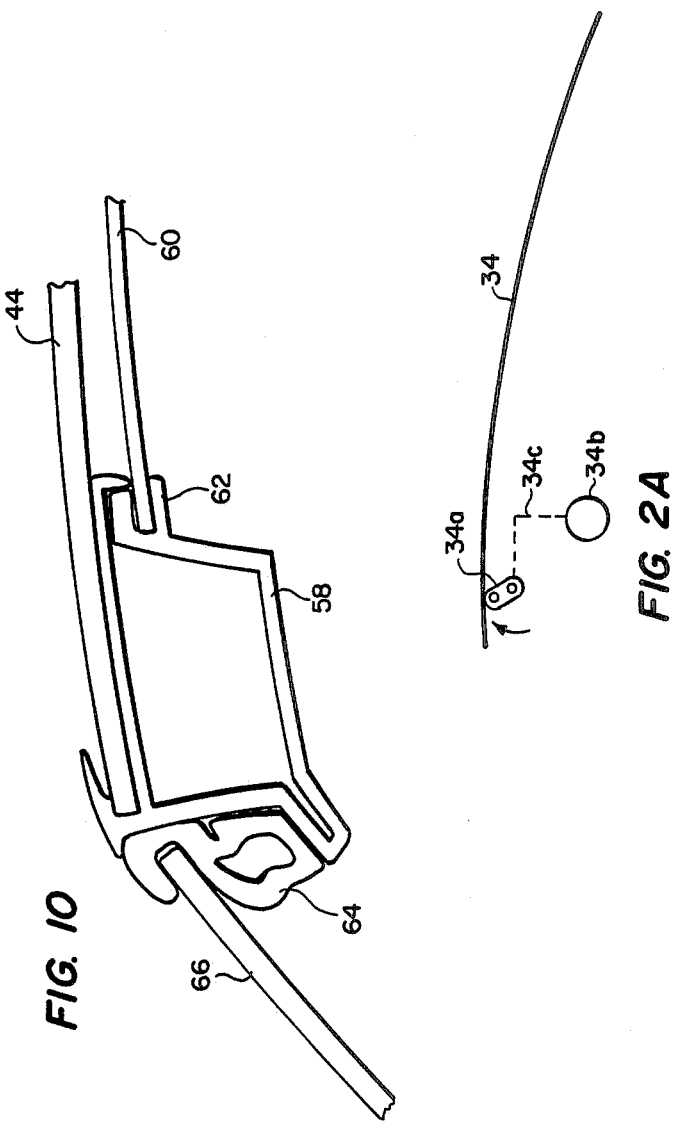

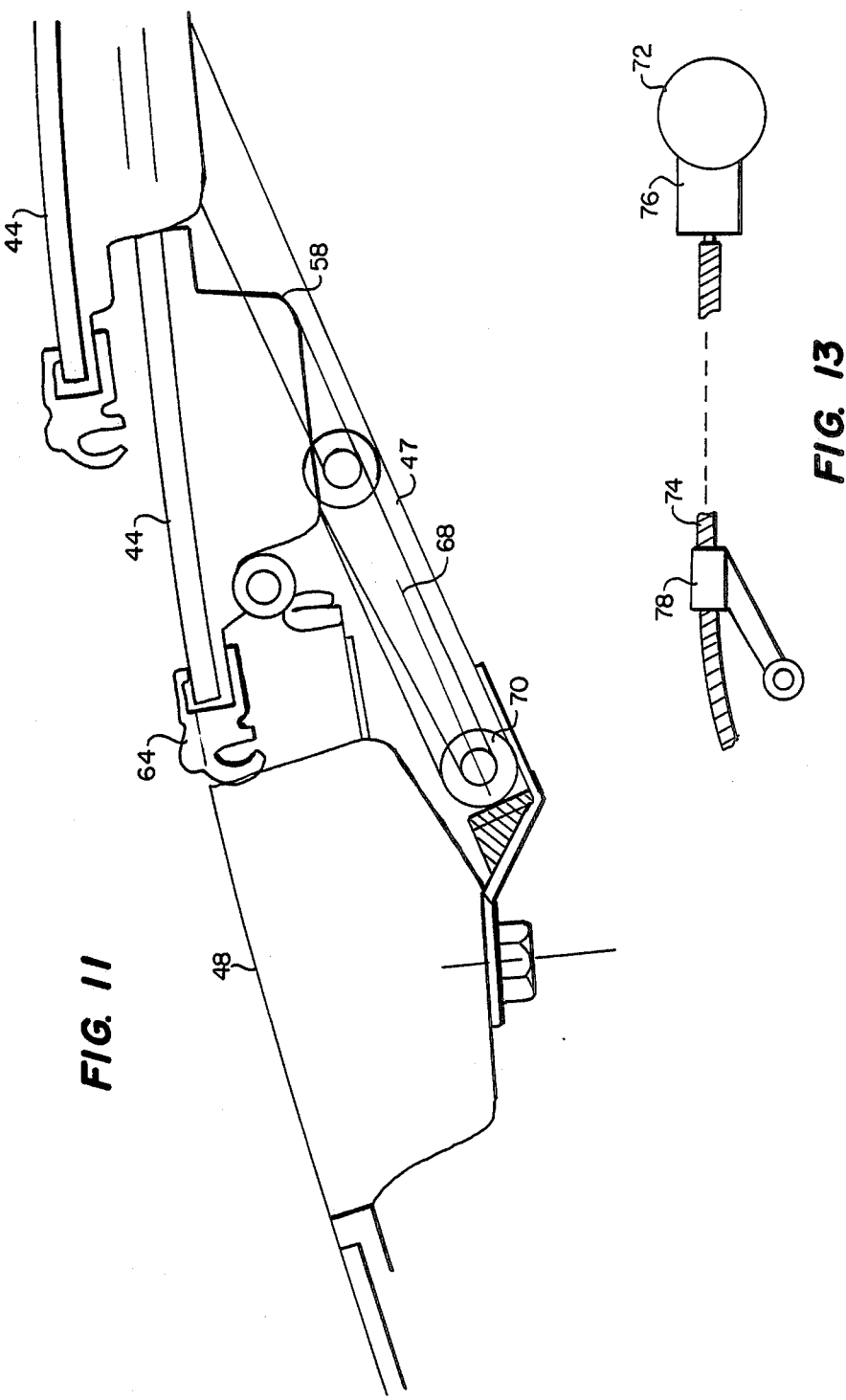

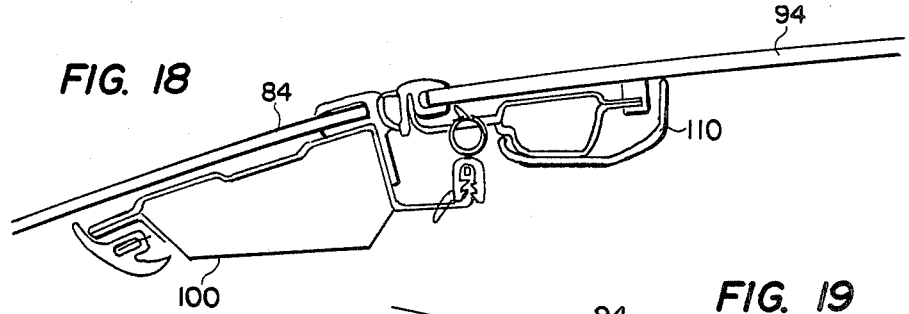
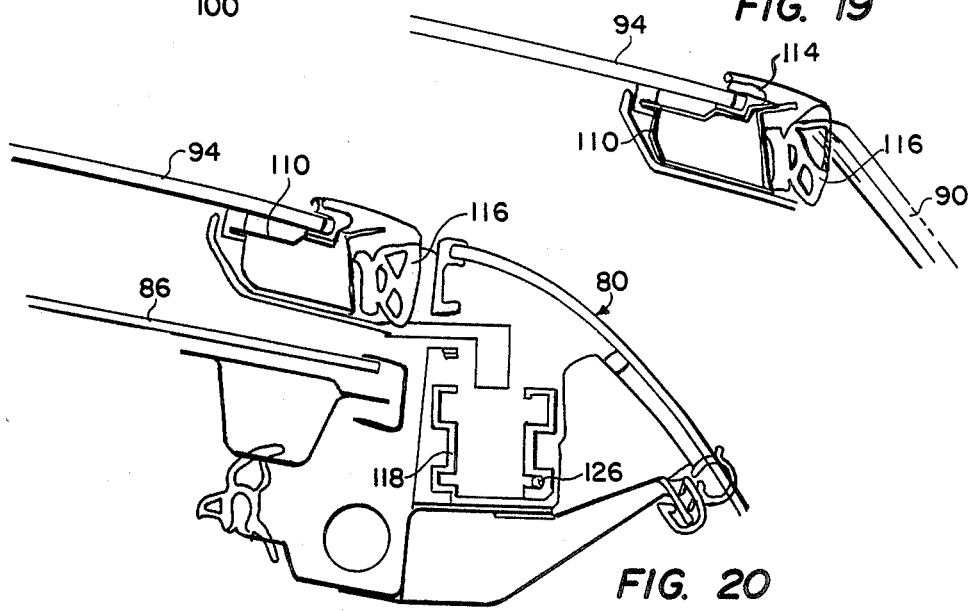
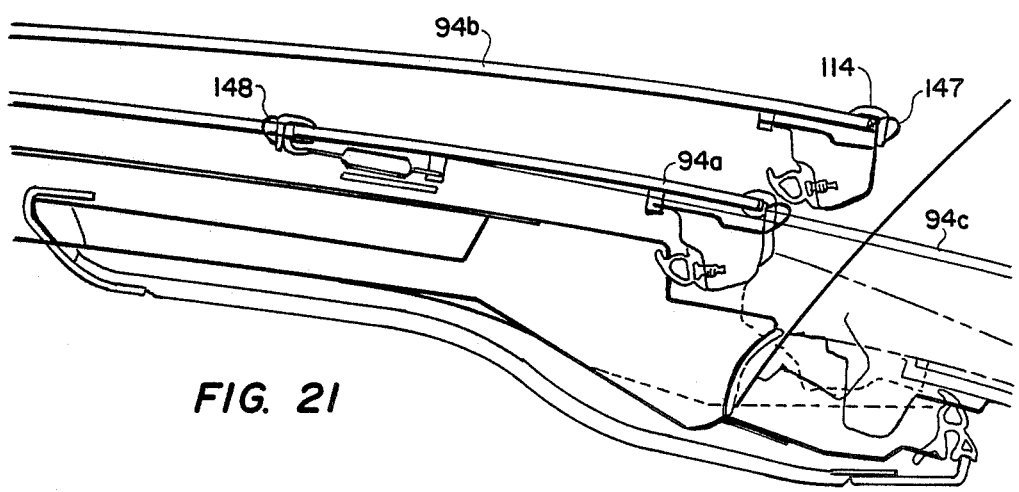

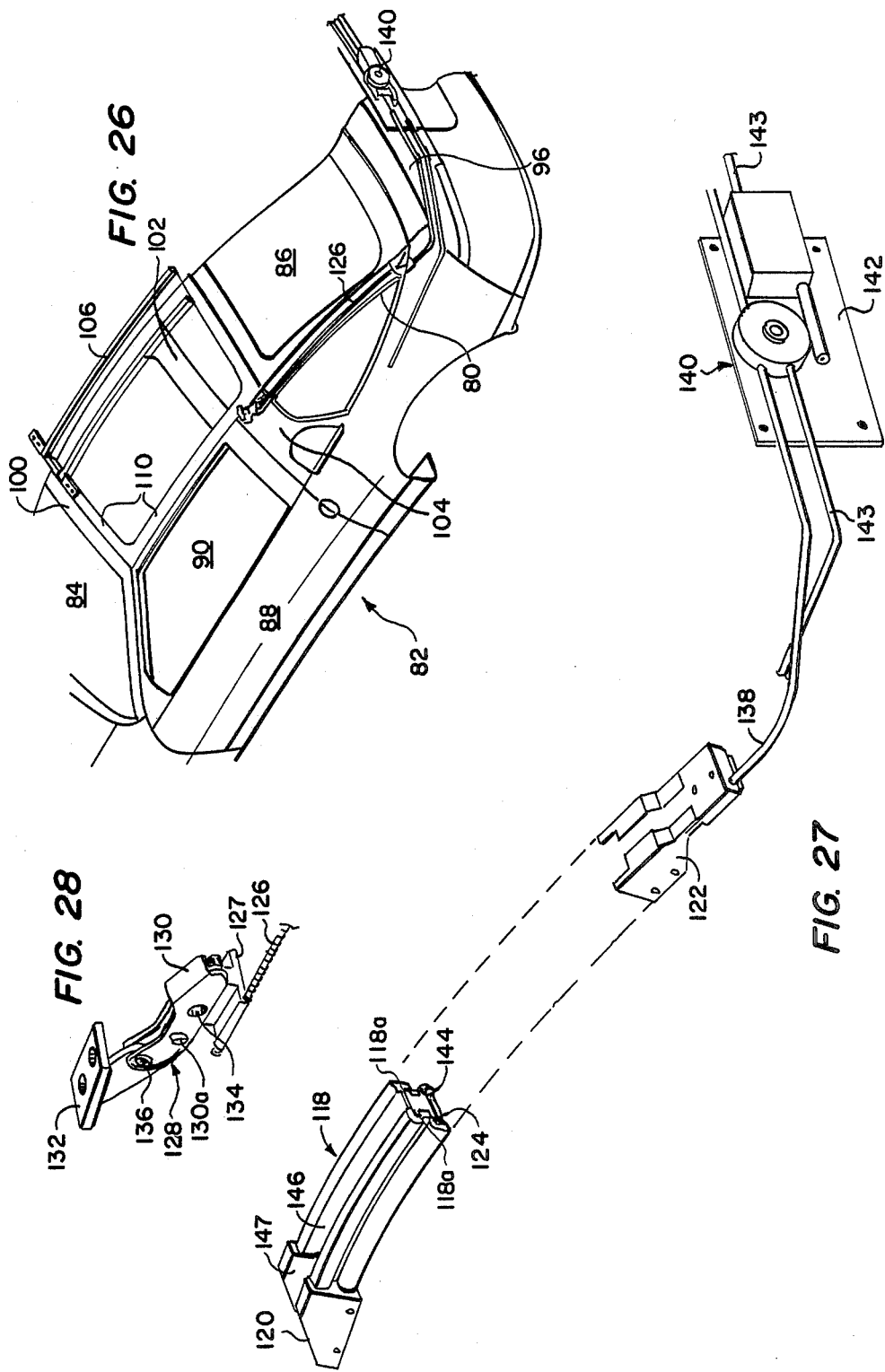

TRANSPARENT ROOF CONVERTIBLE AUTOMOBILE

CROSS-REFERENCE TO RELATED APPLICATION

This application is a continuation-in-part of prior application Ser. No. 107,862 filed Oct. 7, 1987, now abandoned, which was in turn a continuation of prior application Ser. No. 855,821 filed Apr. 24, 1986 and now abandoned.

BACKGROUND OF THE INVENTION

The present invention relates to vehicle body retractable tops, and more particularly, to vehicle body retractable roof top panels that translate between normal and storage positions.

Various convertible car tops of both the hard and collapsible fabric type are well known in the automobile industry. A major disadvantage of the fabric convertible top is that it can be easily torn. It also gives the car a noisier ride and is much more subject to sun and other weather related damage than a hard top. Convertible hard tops tend to have complicated and cumbersome constructions. Recently sun roofs have enjoyed considerable commercial success because they offer an inexpensive alternative to a true convertible. However, pop-up sun roofs do not give an open air feeling. Rearwardly retracting sun roofs can only open the forward half of a passenger sedan roof because the sun roof must be stowed in the remaining half. Therefore retracting sun roofs are generally not used in two-seat sports cars. Some sports cars have used hard tops which are completely removable. Other sports cars have so-called "T-tops" which comprise glass roof sections which are completely removable from either side of a central, longitudinally extending roof beam. Removable hard top roofs and roof panels are inconvenient and cumbersome. Often the removable roof or roof panels take up too much space to be stored in the trunk of a sports car and must therefore be stored in a garage. This makes it impractical to convert to the open roof configuration while "on the road."

SUMMARY OF THE INVENTION

It is therefore the primary object of the present invention to provide an improved retractable roof construction for an automobile.

Another object of the present invention is to provide a retractable hard top roof construction for an automobile that will give the driver and passenger a true open air feeling.

Another object of the present invention is to provide a retractable hard top roof construction which may be used with both hatch back, T-bar and other body styles.

Another object of the present invention is to provide a retractable roof construction in which a roof panel is displaced rearwardly a sufficient distance to open substantially the entire passenger compartment.

According to the present invention an automobile body is provided that has a front windshield, a rear window and a pair of side panels cooperatively defining a passenger compartment with a roof opening. A transparent roof panel having an area corresponding to that of the roof opening is mounted for generally translatory movement from a normal position in which it covers the roof opening to a retracted position in which the roof opening is uncovered. When the transparent roof panel is in its retracted position it lies either above or below the rear window so that a person seated in the passenger compartment can view in a rearward direction through both the rear window and the transparent roof panel.

BRIEF DESCRIPTION OF THE DRAWINGS

FIG. 2A is a schematic diagram of the lifters used in our first embodiment.

FIG. 10 is an enlarged transverse cross-sectional view of the side portion of the roof panel of the third embodiment.

FIG. 11 is an enlarged longitudinal sectional view of the third embodiment taken along line 11—11 of FIG. 9.

FIG. 13 illustrates simplified drive mechanism for moving the transparent roof panel.

FIG. 18 is an enlarged longitudinal sectional view taken along line 18—18 of FIG. 14.

FIG. 19 is an enlarged cross-sectional view taken along line 19—19 of FIG. 14.

FIG. 20 is an enlarged cross-sectional view taken along line 20—20 of FIG. 14. The tilt and slider unit is not illustrated.

FIG. 21 is an enlarged longitudinal sectional view taken along center line 21—21 of FIG. 14 illustrating three different positions of the roof panel.

FIG. 26 is a fragmentary perspective view of the fourth embodiment illustrating the location of the motorized cable drive for retracting the roof panel.

FIG. 27 is an enlarged fragmentary view of one of the cable drive and track assemblies.

FIG. 28 is an enlarged view of a tilt and slider unit, a pair of which are attached to opposite rear corners of the roof panel for lifting the same above the leading edge of the rear window.

DESCRIPTION OF THE PREFERRED EMBODIMENTS

Figure 1:
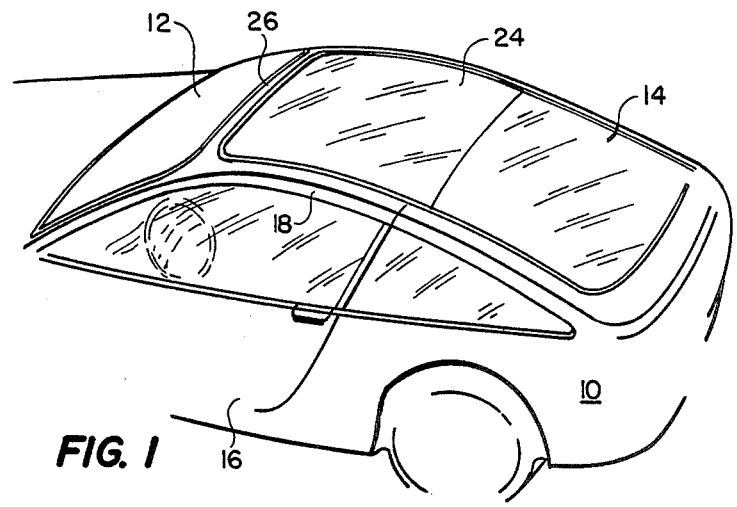
FIGS. 1-3 are a sequence of perspective views illustrating a first embodiment of our invention.

Referring to FIG. 1, in a first embodiment of the invention an automobile body 10 has a front windshield 12, a rear window 14 and a pair of side panels in the form of doors 16. The doors have upper longitudinally extending roof rails 18. The front windshield 12, rear window 14 and doors 16 cooperatively define a two-seat passenger compartment 20 (FIG. 3) with a roof opening 22. A rectangular transparent roof panel 24 (FIG. 1) is mounted for generally translatory movement in a longitudinal direction relative to the body. The roof panel may be made of shatterproof automotive glass, LEXAN (Trademark) plastic or other suitable transparent material. The roof panel is slightly curved and has an area slightly larger than that of the roof opening 22. The roof panel is mounted for sliding movement from a normal or operative position illustrated in FIG. 1 in which it covers the roof opening, through an intermediate position illustrated in FIG. 2, to a fully retracted or stowed position illustrated in FIG. 3 which leaves the roof opening 22 completely uncovered. When the roof panel 24 is in its normal (closed) position illustrated in FIG. 1, the trailing and leading edges of the roof panel and rear window are in substantially abutting, i.e. colinear, relationship. When the roof panel 24 is in its retracted position, it is aligned with and underlies the rear window 14 nearly parallel thereto so that a person seated in the passenger compartment can view in a rearward direction through both the rear window 14 and the roof panel 24.

Preferably the angle between the roof panel and the overlying rear window is selected to eliminate the double reflections of following headlights which a driver seated in a driving position in the passenger compartment would otherwise see when looking rearward through the same. This requires that the angle between the roof panel and the rear window, when the overlap, is greater than or equal to approximately five degrees. However, if the angle between the roof panel and the rear window is too great, the width of the rear window pillars will be too great. Therefore, the angle between the roof panel and the rear window, when they overlap, is preferably less than or equal to approximately ten degrees. The roof panel and rear window are both preferably curved. Therefore the angle between them refers to the angle between a line connecting the mid points of the leading and trailing edges of the roof panel and a line connecting the mid points of the leading and trailing edges of the rear window, when the roof panel is fully retracted.

Figure 2:
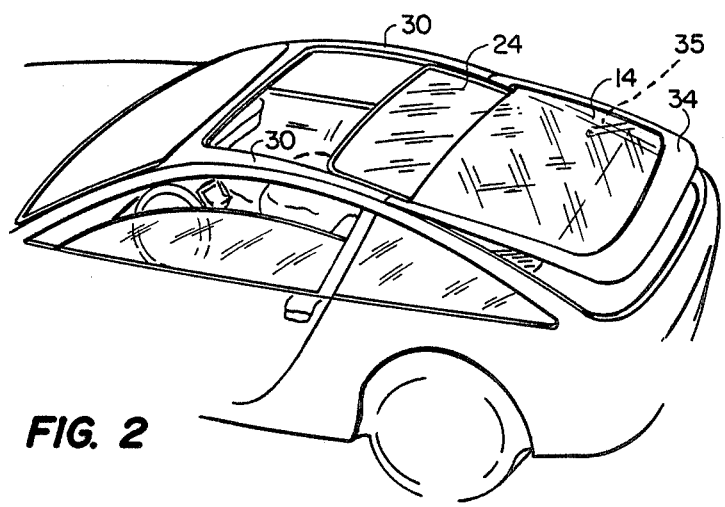
Figure 3:
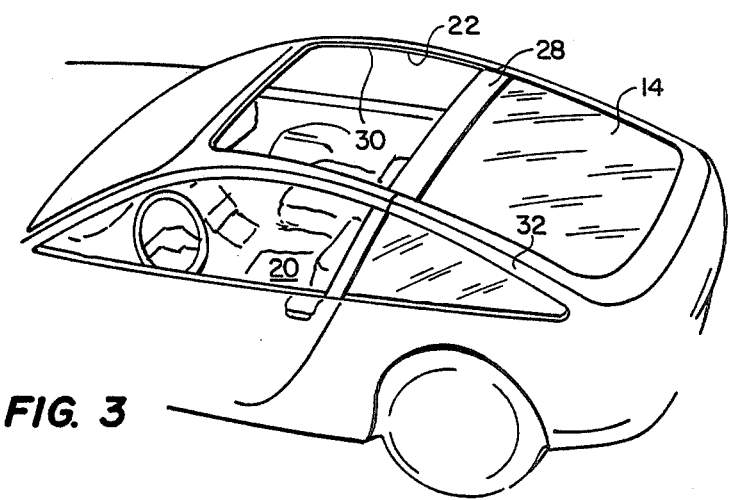

Continuing with a description of the first embodiment of FIGS. 1-3, the roof opening 22 is defined by a forward transversely extending frame member 26 (FIG. 1), a rearward transversely extending frame member or roll bar 28 (FIG. 3), and a pair of side frame members 30 (FIG. 2). The side edges of the roof panel 24 slide in tracks formed in the inwardly facing edges of the side frame members 30 and in a pair of inclined rear window pillars 32.

The rear window 14 is rigidly supported by a U-shaped frame 34 whose forward legs are attached by hinge mechanisms 35 (FIG. 2) to the respective view window pillars 32. The leading edge of the rear window 14 is spaced a small distance from the forward ends of the legs of the U-shaped frame 34. The rearward end of the frame 34 and rear window 14 supported thereby can be pivoted upwardly as illustrated in FIG. 2. At the same time the forward ends of the legs of the U-shaped frame 34 can be raised by suitable mechanisms. These may take the form of rotating lifters 34a (FIG. 2A) driven by motor 34b via linkage 34c. These lifters are connected to the frame 34 that supports the rear window 14 by pins and to shafts driven by the motor 34b. These shafts are journaled in the pillars. The lifting of the forward portion of the frame 34 provides a sufficient degree of clearance to permit the transparent roof panel 24 to slide to its retracted position. The rear window and supporting frame may then be pivoted downwardly to their closed positions illustrated in FIG. 3 without the leading edge of rear window 14 hitting the roof panel 24.

A drive mechanism in the form of an electric motor and gear driven linkage (FIG. 13) are mounted inside the frame members 28 and 30 for moving the transparent roof panel between its normal (closed) position and its retracted position. These may have constructions similar to motorized sun roofs in automobiles currently on the market.

Figure 4:
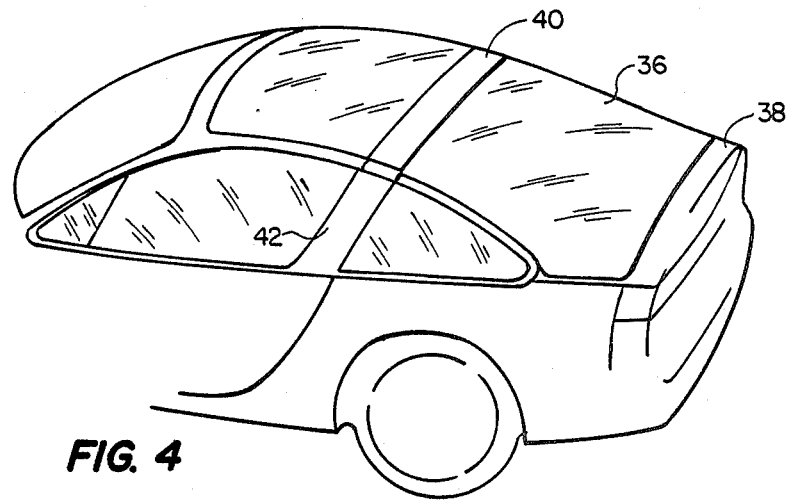
FIGS. 4-6 are a sequence of perspective views illustrating a second embodiment of our invention.
Figure 5:
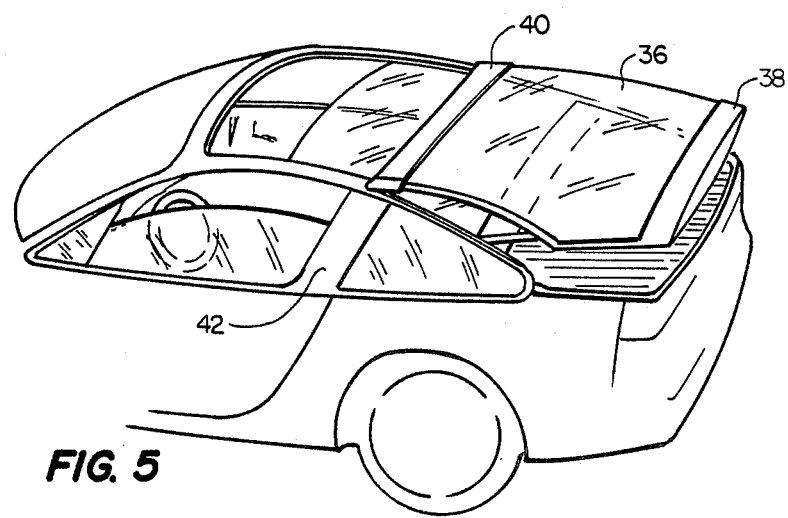
Figure 6:
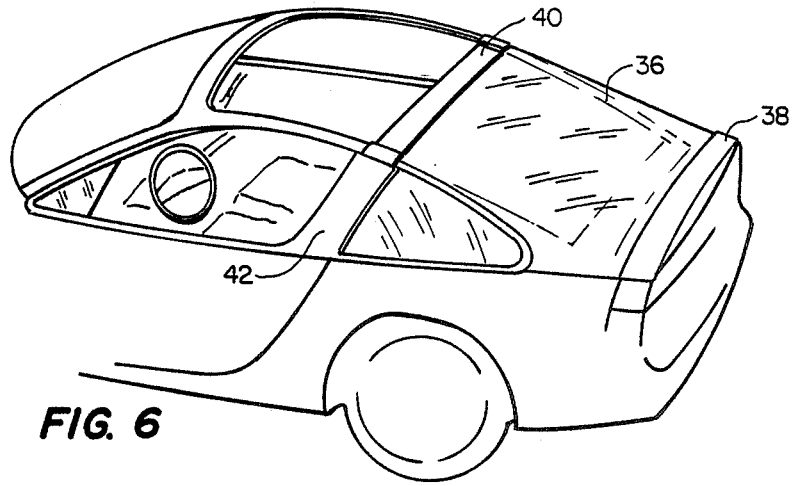

A second embodiment of our invention is illustrated in FIGS. 4-6 and is similar to the first embodiment except that the rear window 36 and surrounding frame 38 are of the hatch-back style. The frame 38 has a forward cross-piece 40 that pivots with the rear window and extends between a pair of vertical door posts 42. Again the cross-piece 40 is lifted to allow frame 38 and rear window 36 to be swung closed without cross-piece 40 hitting the roof panel. When the hatch-back is closed the cross-piece 40 serves as a roll bar.

Figure 7:
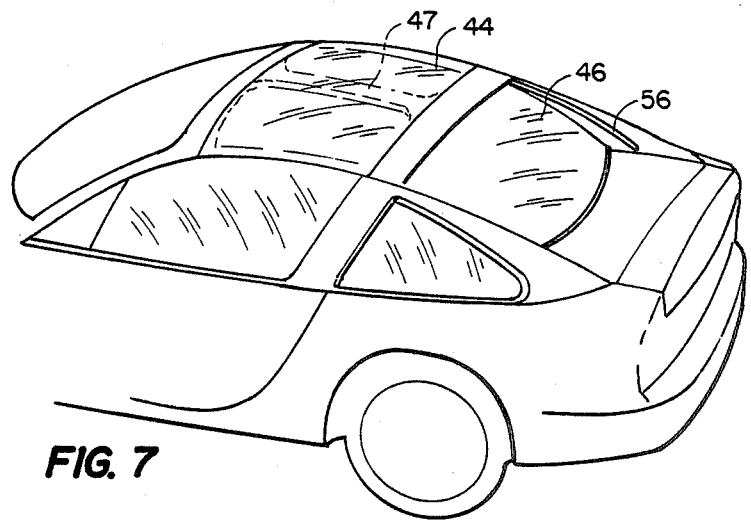
FIGS. 7-9 are a sequence of perspective views illustrating a third embodiment of our invention.
Figure 8:
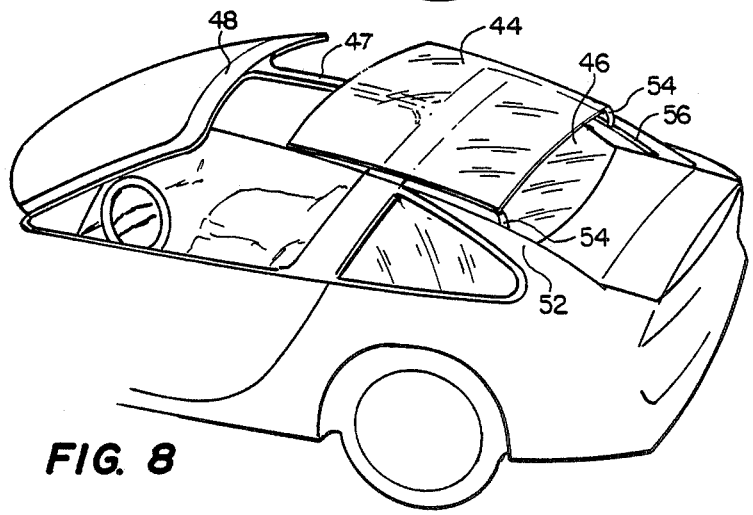
Figure 9:
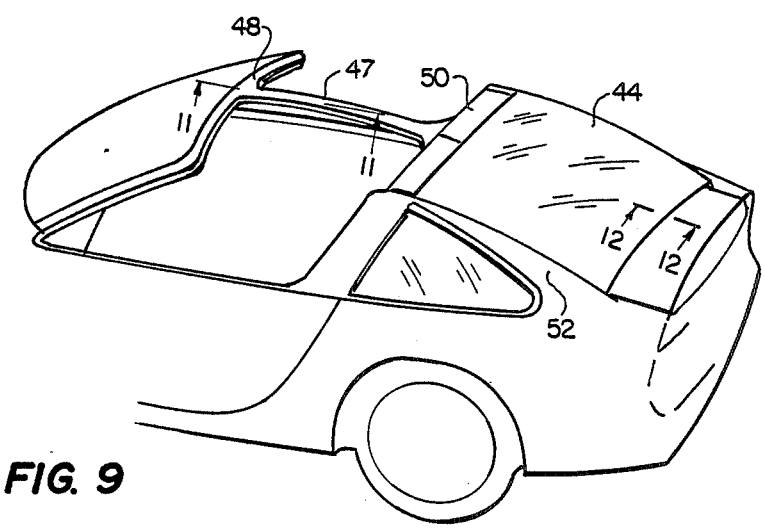

A third embodiment of our invention is illustrated in FIGS. 7-9 and has a transparent roof panel 44 that slides into a retracted position above the rear window 46. This rear window is more steeply inclined than the rear windows of our first two embodiments. Basically, the body style of our third embodiment is more in the nature of a coup or sedan as opposed to the fast back styles of our first two embodiments. A longitudinally extending T-bar or supporting member 47 (FIGS. 8 and 9) connects the center of the forward transverse window frame member 48 with the center of the rear transverse roll bar member 50 (FIG. 9). The passenger doors of our third embodiment are of the so-called frame-less type, i.e. they have no side roof rails. Thus, when the side door windows are rolled down, as illustrated in FIG. 9, the driver and passenger have a more open air feeling.

The center supporting member 47 (FIGS. 7 and 8) of the third embodiment divides the roof opening into two equal sides. Mounting means are provided for slidingly attaching a front center portion of the transparent roof panel to the central support member and a pair of opposite rear corners of the roof panel to a pair of inclined rear window posts 52 of the vehicle body. An arm (not visible) connected to the forward edge of the roof panel is received in an upwardly opening slot (not visible) that extends down the center of the support member 47. Similar arms 54 (FIG. 8) are connected to opposite rear corners of the transparent roof panel 44 and have wheels (not visible) rotatably mounted to their lower ends which ride in inwardly opening tracks 56 formed in the inclined rear window posts 52. An electric motor (not shown) is mounted inside the central support member 47 or the roll bar member 50. The motor is drivingly connected to the arm that slides inside the support member 47 by a gear linkage or other suitable means for moving the transparent roof panel between its closed and retracted positions illustrated in FIGS. 7 and 9, respectively. The drive mechanisms initially lift the rearward edge of the roof panel 44 to clear the roll bar member 50 before it is slid rearwardly.

FIG. 10 illustrates construction details of the roof panel of our third embodiment. A hollow box-shaped rectangular frame 58 is attached to the underside of the transparent roof panel 44. The frame 58 is preferably made of metal, such as aluminum, and extends around the entire periphery of the roof panel. This frame reinforces the strength of the roof panel and prevents warping or other distortions of the shape thereof due to thermal variations or mechanical forces. This aids the roof panel in holding the close tolerances that will ensure proper fitting and sealing as well as a smooth, unhindered movement between closed and retracted positions.

Referring still to FIG. 10, a thin shade panel 60 has its side edges supported for sliding movement between flanges 62 extending from the frame 58. The shade is also preferably transparent and may be tinted to reduce the amount of incident sunlight on the driver and passenger. Alternatively, the shade may have polarized stripes, squares or other patterns that may be slid into registration with similar patterns in the roof panel to provide a variable degree of sunlight filtering. A locking mechanism may be provided so that when the roof panel is in its retracted position, the shade panel is prevented from moving into a registration that would undesirably limit the driver's rear view visibility.

Referring still to FIG. 10, deformable encapsulations such as 64 may be attached about the outer periphery of the rectangular reinforcing frame 58. The encapsulations are provided with slots that snugly receive the upper edges of the side windows 66 when they are rolled up.

FIG. 11 illustrates further details of the third embodiment of our invention, and in particular, the mating of the forward edge of the roof panel 44 with the forward transverse window frame member 48. An arm 68 is connected to the underside of the forward segment of the rectangular reinforcing frame 58 intermediate its width. The arm extends forward and downwardly into the upwardly opening slot in the support member 47. A wheel 70 is rotatably mounted to the lower end of the arm 68 and rides along the lower wall of the slot. This wall is initially inclined upwardly in a rearward direction to lift the roof panel to its raised position in FIG. 11 as it starts to move rearwardly. The encapsulation 64 connected to the forward side of the reinforcing frame 46 provides a seal when the roof panel is in its closed position.

Figure 12:
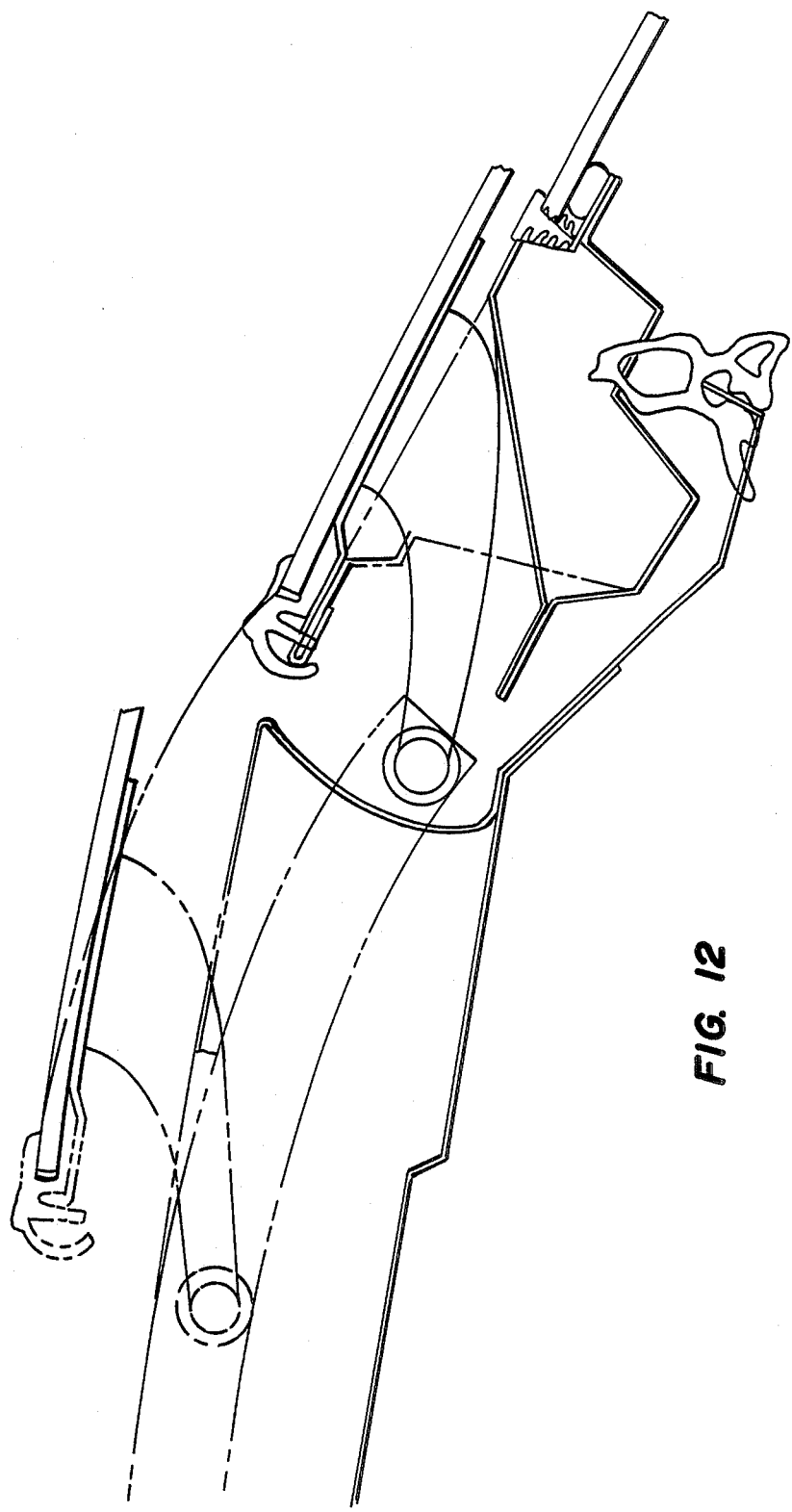
FIG. 12 is an enlarged longitudinal sectional view of the third embodiment taken along line 12—12 of FIG. 9.

FIG. 12 illustrates details of the construction of the rear portion of the third embodiment.

Referring to FIG. 13, a drive mechanism suitable for the third embodiment includes a motor 72 which is coupled to the rear end of an elongate, flexible NYLON (trademark) synthetic polymer screw 74 through a gear reduction 76. The arm 68 is connected to a track nut 78 and moves longitudinally along the same as the screw is rotated by the motor. The screw 74 is slightly curved to conform to the curvature of the support member 47. This curvature is maintained during rotation of the screw by a bearing (not shown) which holds the forward end of the screw.

It is believed that the foregoing description has described our invention adequately to enable one of ordinary skill in the art to practice the same without unreasonable experimentation. Nevertheless, FIGS. 14–28 have been included which illustrate a fourth embodiment of our invention in extreme detail. They further clarify the invention and illustrate one pre-production design incorporating the same.

Figure 14:
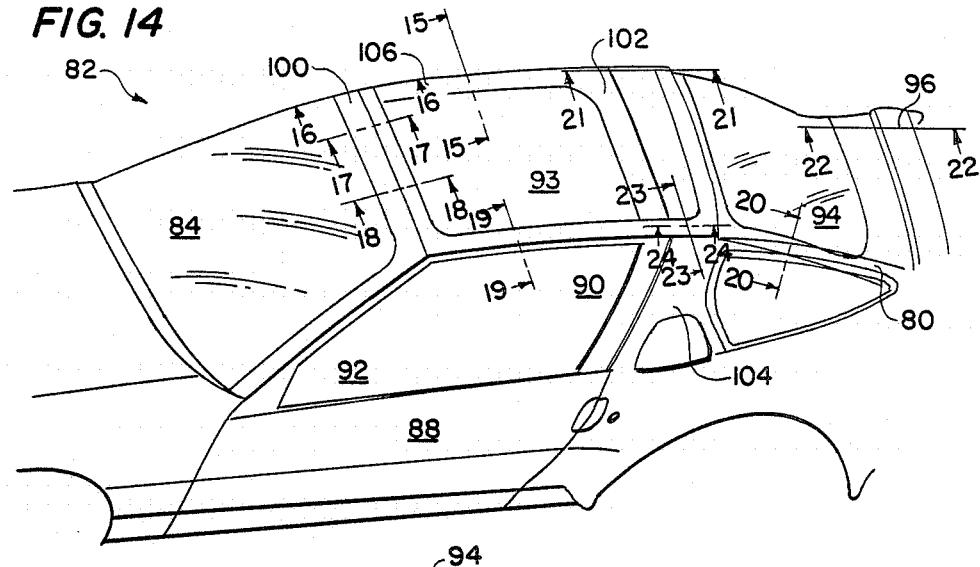
FIG. 14 is a perspective view of a left hand longitudinal section of an automobile incorporating a fourth embodiment of the invention.
Figure 15:
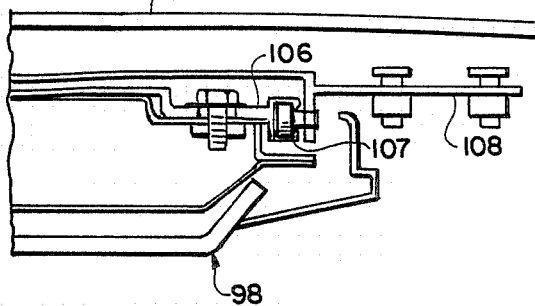
FIG. 15 is an enlarged cross-sectional view taken along line 15—15 of FIG. 14.
Figure 16:
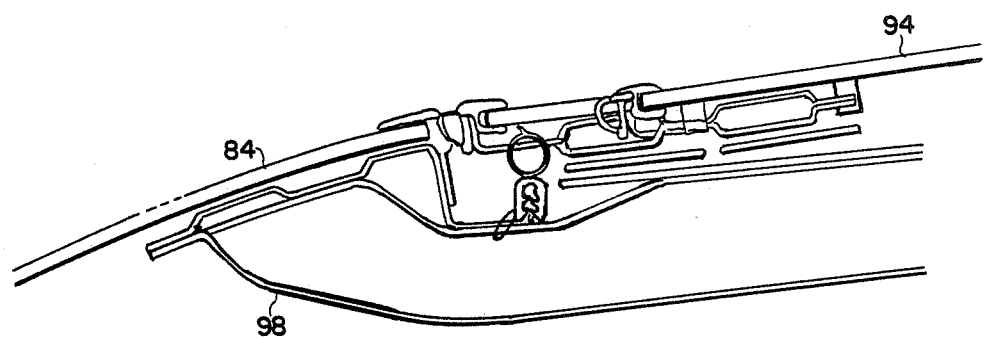
FIG. 16 is an enlarged longitudinal sectional view taken along line 16—16 of FIG. 14.
Figure 17:
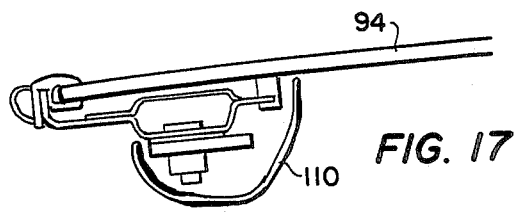
FIG. 17 is an enlarged longitudinal sectional view taken along line 17—17 of FIG. 14.
Figure 25:
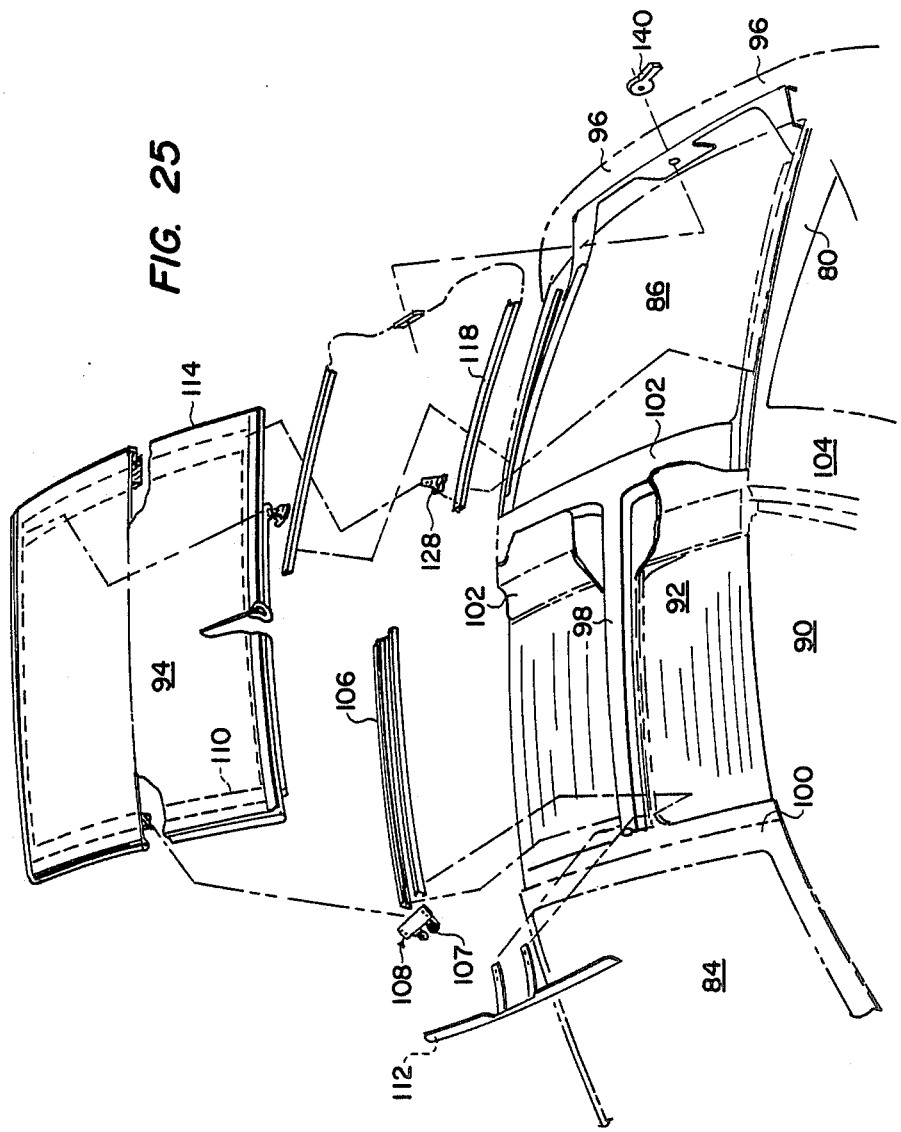
FIG. 25 is an exploded perspective view of the fourth embodiment of the invention illustrating the relationship of the transparent roof panel, track assemblies and T-bar.

The fourth embodiment of our invention illustrated generally in FIGS. 14, 25 and 26 is similar to the third embodiment of FIGS. 7–9 in that they both utilize a T-bar for supporting the front middle area of the transparent roof panel. In both the third and fourth embodiments the roof panel slides into a stowed position above the rear window. The roof panel, when stowed, is nearly parallel to the rear window, i.e. The angle therebetween is greater than or equal to approximately five degrees and less than or equal to approximately ten degrees. The five degree minimum insures that the drive will not see double reflections when viewing through the aligned rear window and roof panel. The ten degree maximum insures that the thickness of rear window pillars 80 (FIG. 25) will not be exaggerated to a point of being aesthetically displeasing.

Referring to FIG. 14, an automobile body generally designated 82 has a front windshield 84, a rear window 86 (FIG. 26), and a pair of side panels in the form of doors 88. The doors are of the frameless type, i.e. they have no side roof rails. This is best seen in FIG. 25. The side door windows 90 (FIG. 14) have upper edges that are received in encapsulations hereafter described which are connected to the roof panel to provide a watertight seal when the side windows are fully rolled up. The front windshield 84, rear window 86 and side door windows 90 cooperatively define a two-seat passenger compartment 92 with a roof opening 93 (FIG. 14) that is normally covered by a rectangular transparent roof panel 94. The roof panel 94 is shown in its retracted or stowed position in FIG. 14 and the side edges thereof are made visible so that the positional relationships may be better understood. The rear window 86 is supported in a fixed position between the longitudinally extending, inclined window pillars 80, whose rearward ends are connected by a transversely extending rear deck 96 (FIG. 25).

A longitudinally extending T-bar or central support member 98 (FIGS. 14 and 25) has its forward end rigidly connected to the center of the front windshield frame 100 and its rearward end rigidly connected to the center of a roll bar 102. The opposite ends of the roll bar are rigidly connected to the upper ends of roof pillars 104 on either side of the automobile body 82. An elongate, guide rail or track 106 (FIG. 25) is secured to the top of the T-bar 98. Rollers 107 (FIG. 15) attached to a bracket 108 ride in the outwarding opening longitudinal channels of the rail 106. This bracket 108 is secured to a rectangular support frame 110 (FIG. 25) connected to the underside of the transparent roof panel 94. The bracket 108 is secured to the medial area of the forward cross-piece of the frame 110. A transversely extending wind deflector 112 is attached to the windshield frame 100 to keep wind from entering the passenger compartment when the roof panel is in its rear stowed position and the automobile is traveling at highway speed. A sash 114 surrounds the peripheral edges of the transparent roof panel 94.

FIGS. 16–19 illustrate details of the construction that permits the leading edge of the transparent roof panel 94 to mate and seal with the top edge of the front windshield 84 when the roof panel is in its normal or closed position. The various encapsulations and supporting structures are readily apparent from these drawing figures and need not be verbally described.

Referring to FIG. 19, an encapsulation or seal 116 is connected to the longitudinally extending side legs of the frame 110 attached to the roof panel 94. The various encapsulations in the fourth embodiment are preferably made of a compressible but otherwise semi-rigid plastic material so that they will deform slightly upon suitable pressure being applied thereto but will return to their original shape when the pressure is removed. Synthetic rubber or other plastics are well known in the art for fabricating such encapsulations. The upper edges of the side door windows 90 are received in slots formed in these encapsulations. Any time the roof panel 94 is being retracted or returned, the side door windows 90 are first automatically rolled down a slight amount to disengage their upper edges from the encapsulations 116. This prevents the upper window edges from sliding in these encapsulations which would result in unnecessary friction and undesirable wear.

FIG. 20 is a cross-sectional view along line 20—20 of FIG. 14 through the aligned roof panel 94, underlying rear window 86 and rear pillar 80. This view illustrates the construction of the track assemblies which permit sliding movement of the roof panel. A track assembly 118 (FIGS. 20 and 27) extends longitudinally inside each rear window pillar 80. These track assemblies incline downwardly from the roll bar 102 and terminate near the rear deck 96. For the sake of brevity, only one track assembly and cable drive will be described, it being understood that the corresponding structure on the other side of the automobile body is identical. A die-cast top or cap 120 (FIG. 27) is connected to the upper end of the rail assembly 118. Similarly a die-cast rail end 122 is connected to the lower end of the track assembly 118. The track assembly 118 may be an extruded metal or plastic piece having a lower longitudinally extending rounded passage 124 (FIG. 27) which serves as a guide channel for a geared cable 126 (FIG. 28).

The upper end of the cable 126 (FIG. 28) is attached to the T-shaped shoe 127 of a tilt and slider unit 128. This unit further includes an intermediate link 130 and an upper bracket 132. The intermediate link 130 is pivotally connected to the shoe 127 by a pin 134 and to the upper bracket by a pin 136. The upper brackets are not illustrated in FIG. 25. The lower end of the cable 126 is fed through a guide pipe 138 (FIG. 27) which bends around the rear deck 96 and feeds the cable to an electric motor drive 140. This drive pulls and pushes the geared cable to pull and push the tilt and slider unit to and fro in the track assembly 118. This motor drive is supported on a plate 142 which is mounted to the automobile body beneath the deck 96, midway of the transverse width thereof. A similar guide pipe 143 extends from the motor drive 140 along the rear deck 96 up the right side of the automobile body to a similar tilt and slide unit in a similar track assembly. Each of the guide pipes has a rear end that wraps around the other side of the automobile body to accommodate the excess cable as it is pulled. As will be explained further hereafter, the tilt and slider units pulled by the cables slide the transparent roof panel 94 between its normal or closed position and its retracted or stowed position.

Figure 23:
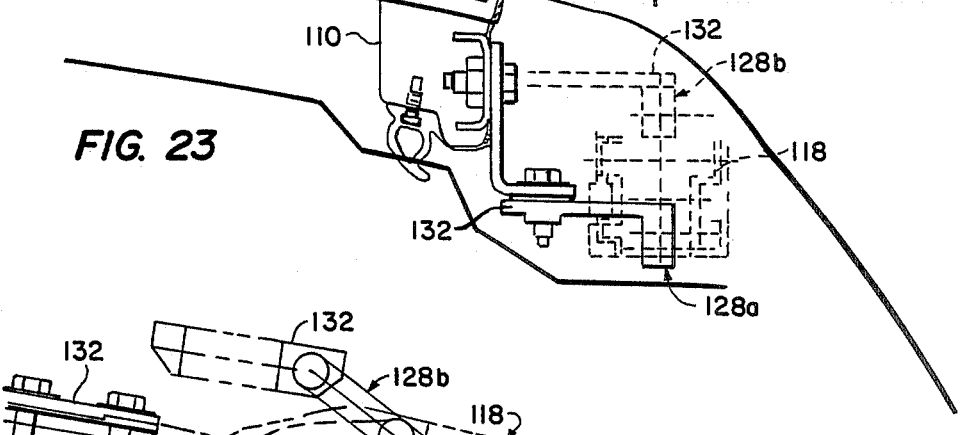
FIG. 23 is an enlarged cross-sectional view taken along line 23—23 of FIG. 14. The tilt and slider unit is illustrated in its lowered position in solid lines and in its raised position in phantom lines. The track assembly is illustrated in phantom lines.
Figure 24:
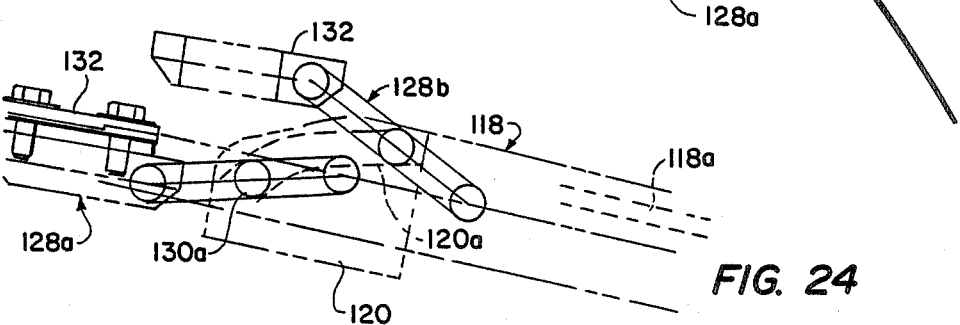
FIG. 24 is an enlarged longitudinal sectional view taken along line 24—24 of FIG. 14. The tilt and slider unit is illustrated in schematic form in its lowered and raised positions.

Referring again to FIG. 28, the shoe 127 of the tilt and slider unit 128 slides in the lower channels or passages 124 and 144 of the track assembly 118. Referring to FIGS. 20 and 28, the track assembly has a top opening 146 which extends substantially the entire length thereof. The opening 146 communicates with a similar top opening 147 (FIG. 27) in the top of cap 120. The upper bracket 132 of the tilt and slider unit 128 is bolted to a side piece of frame 110 which underlies and carries the transparent roof panel. Referring to FIG. 24, when the roof panel 94 is fully closed, the tilt and slider unit is in its lowered position illustrated at 128a forward of the cap 120. FIG. 23 is a cross-sectional view at roughly the same location as the longitudinal sectional view of FIG. 24. It illustrates the lowered position of the tilt and slider unit in solid lines at 128a and the raised position of the unit in phantom lines at 128b.

Referring to FIG. 21, when the roof panel is fully closed at the position illustrated at 94a, the transparent roof panel 94 is co-linear with the rear window 86. An encapsulation (not illustrated) along the leading edge of the rear window 86 is in abutment with an encapsulation 147 along the trailing edge of the roof panel 94 (not illustrated). As cable 126 is pulled rearwardly, a guide pin 130a (FIG. 28) extending through the link 130 rides up inclined grooves 120a (FIG. 24) in the opposite side walls of the cap 120. The tilt and slider unit then reaches a raised position illustrated at 128b in FIG. 24. The grooves 120a in the cap 120 feed into the top channels 118a (FIG. 27) of the track assembly 118. The ends of guide pin 130a then ride in channels 118a as the tilt and slider unit 128 is pulled rearwardly. As this is being done, the side flanges of shoe 127 ride in lower channels 124 and 144 in the track assembly. The upper bracket 132 of the unit, which is attached to the frame 110 carrying the roof panel, extends upwardly through the opening 146 in the track assembly 118.

A similar action happens simultaneously on the other side of the automobile body with the right tilt and slider unit (not illustrated). The result is that the rear edge of the roof panel is raised slightly to the position illustrated at 94b in FIG. 21 to clear the leading edge of the rear window 86.

The forward portion of the roof panel 94 is supported by bracket 108 (FIG. 25) which is connected to the roof panel supporting frame 110 and slides in the center guide rail 106. The forward portion of the roof panel need not be raised. As the tilt and slide mechanisms on either side of the automobile are pulled down their respective curved track assemblies in their raised positions, the complementary curvature of the roof panel 94 and the amount of inclination of the tracks is sufficient so that the forward portion and leading edge of the roof panel 94 will clear both the roll bar 102 and the leading edge of the rear window 86. A more rearwardly position for the roof panel 94 is illustrated at 94c in FIG. 21. The leading edge encapsulation of the roof panel 94 is illustrated at 148. It will be understood that because the rear edge of the roof panel 94 will have descended down the inclined track assemblies 118 by this time, the forward edge of the roof panel is now lower than the rear edge of the roof panel when it is initially lifted to position 94b.

Figure 22:
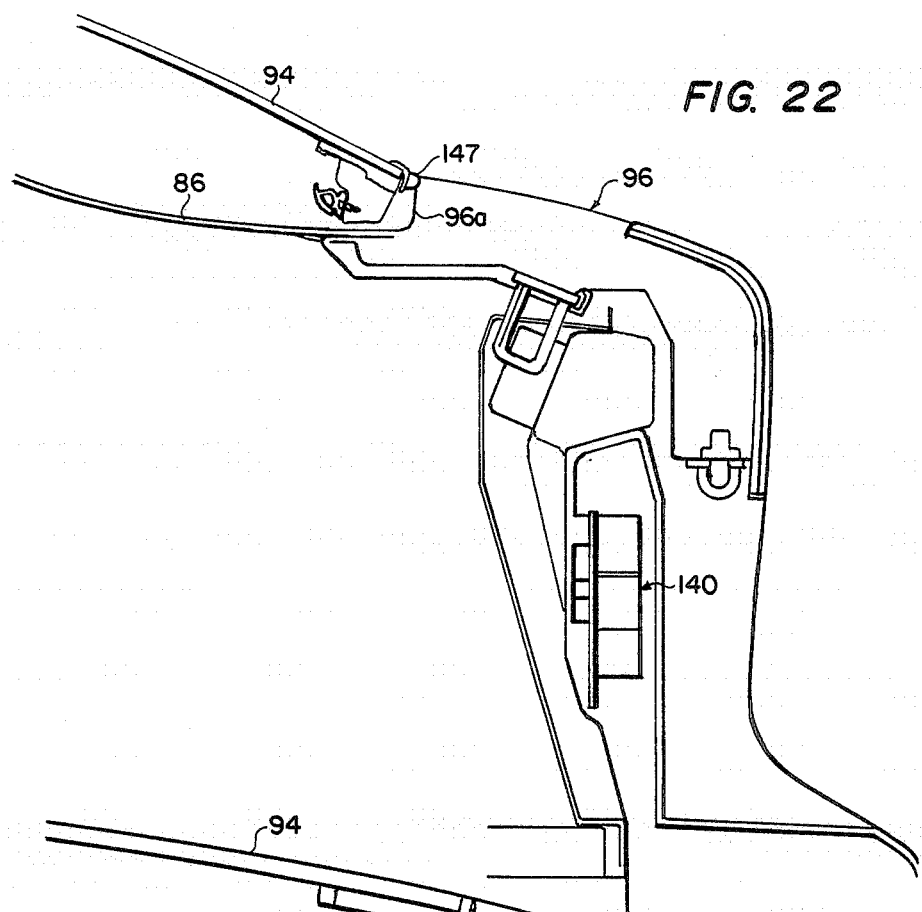
FIG. 22 is an enlarged cross-sectional view taken along line 22—22 of FIG. 14 illustrating the structure of the vehicle body where the trailing edge of the roof panel meets the rear deck.

FIG. 22 illustrates the roof panel 94 in its fully retracted or stowed position. The encapsulation 147 on the rear edge of the roof panel is squeezed against a forwardly facing shoulder 96a of the rear deck 96. As seen in this view, the underlying rear window 86 has an upwardly convex shape.

Having described several embodiments of our transparent roof convertible automobile, it will be apparent that modifications and adaptations thereof will occur to those skilled in the art. Therefore, the protection afforded our invention should only be limited in accordance with the scope of the following claims.

We claim:

1. A convertible roof assembly for an automobile body having a passenger compartment and including a front windshield, a rear window and structure defining a roof opening over the passenger compartment, comprising:

a transparent roof panel movable between a normal position in which it covers the roof opening with a rear edge of the roof panel in colinear relationship with a forward edge of the rear window, and a stowed position in which the roof opening is uncovered and the roof panel and the rear window are aligned and nearly parallel but with an angle there between selected to eliminate double reflections otherwise seen by a driver seated in a driving position in the passenger compartment looking rearwardly through both the roof panel and the rear window;

means for mounting the roof panel for movement between the normal and stowed positions;

means for tilting one of the roof panel and the rear window to move the roof panel and the rear window out of the colinear relationship to permit the movement of the roof panel between the normal and stowed positions; and means for moving the roof panel between the normal and stowed positions.

2. The assembly of claim 1 wherein the means for tilting comprises means for tilting the rear window for permitting the transparent roof panel to move to the stowed position beneath the rear window.

3. The assembly of claim 1 wherein the roof defining structure includes a pair of upper longitudinal side frame members, each defining a side of the roof opening, and the mounting means including means for permitting a pair of opposite side edges of the roof panel to ride longitudinally in the side frame members.

4. The assembly of claim 2 wherein the roof defining structure includes a pair of upper longitudinal side frame members, each defining a side of the roof opening and the mounting means including means for permitting a pair of opposite side edges of the roof panel to ride longitudinally in the side frame members.

5. The assembly of claim 1 wherein the roof panel lies below the rear window when in its stowed position.

6. The assembly of claim 1 wherein the roof panel lies above the rear window when in its stowed position.

7. The assembly of claim 1 wherein the roof panel is curved and has an area slightly larger than an area of the roof opening.

8. The assembly of claim 1 wherein the rear window is upwardly convex and the roof panel is spaced closely adjacent to the rear window when the roof panel is in its stowed position.

9. The assembly of claim 1 wherein the angle between the roof panel and the rear window, when the roof panel is in its stowed position, is greater than or equal to five degrees and less than or equal to ten degrees.

10. A convertible roof assembly for an automobile body having a passenger compartment and including a front windshield, a rear window and structure defining a roof opening over the passenger compartment, comprising:

a transparent roof panel moveable between a normal position in which it covers the roof opening with a rear edge of the roof panel in substantial colinear relationship with a forward edge of the rear window, and a stowed position aligned with and above the rear window;

a central supporting member extending in a longitudinal direction from the front windshield to the rear window to divide the roof opening into opposite sides;

means for attaching a front center portion of the roof panel to the central supporting member for relative movement thereto and for slideably attaching a pair of opposite rear corners of the transparent roof panel to a pair of rear pillars of the automobile body extending at an inclined angle to the horizontal along opposite sides of the rear window, the roof panel being nearly parallel to the rear window when in its stowed position with an angle therebetween selected to eliminate double reflections of following headlights that a driver seated in a driving position in the passenger compartment would otherwise see when looking rearwardly through the aligned roof panel and rear window; and means for moving the roof panel between the normal and stowed positions.

* * * * *